June 1, 1965 W. A. CLAY 3,187,339
THREE DIMENSIONAL VIEWING APPARATUS
Filed Oct. 16, 1961 4 Sheets-Sheet 1
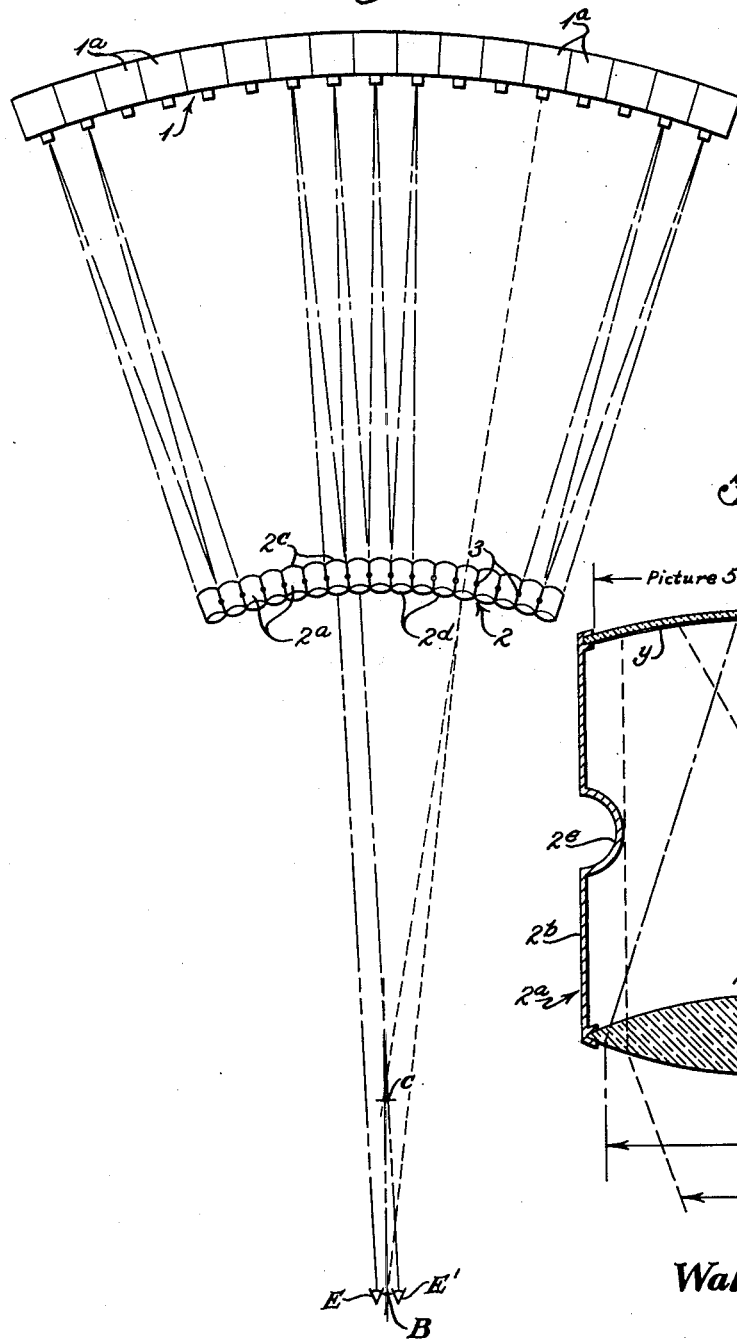
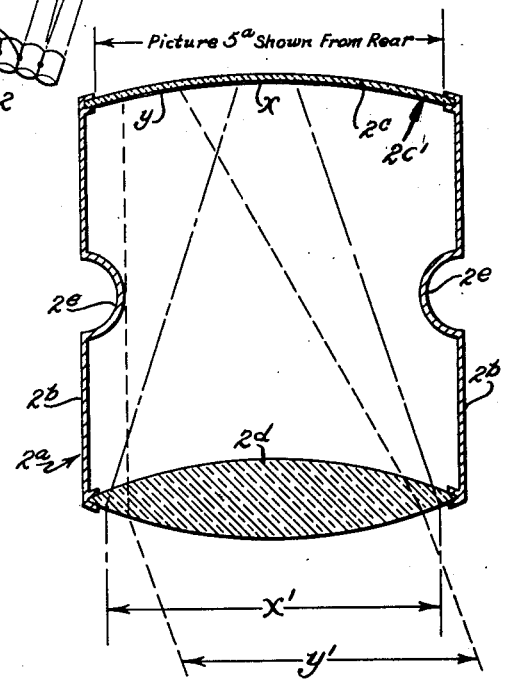
INVENTOR
Wallace A. Clay June 1, 1965  W. A. CLAY  3,187,339
THREE DIMENSIONAL VIEWING APPARATUS
Filed Oct. 16, 1961  4 Sheets-Sheet 2

*INVENTOR.*
WALLACE A. CLAY

June 1, 1965 W. A. CLAY 3,187,339
THREE DIMENSIONAL VIEWING APPARATUS
Filed Oct. 16, 1961 4 Sheets-Sheet 3
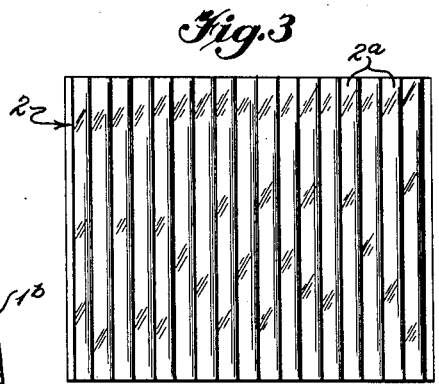
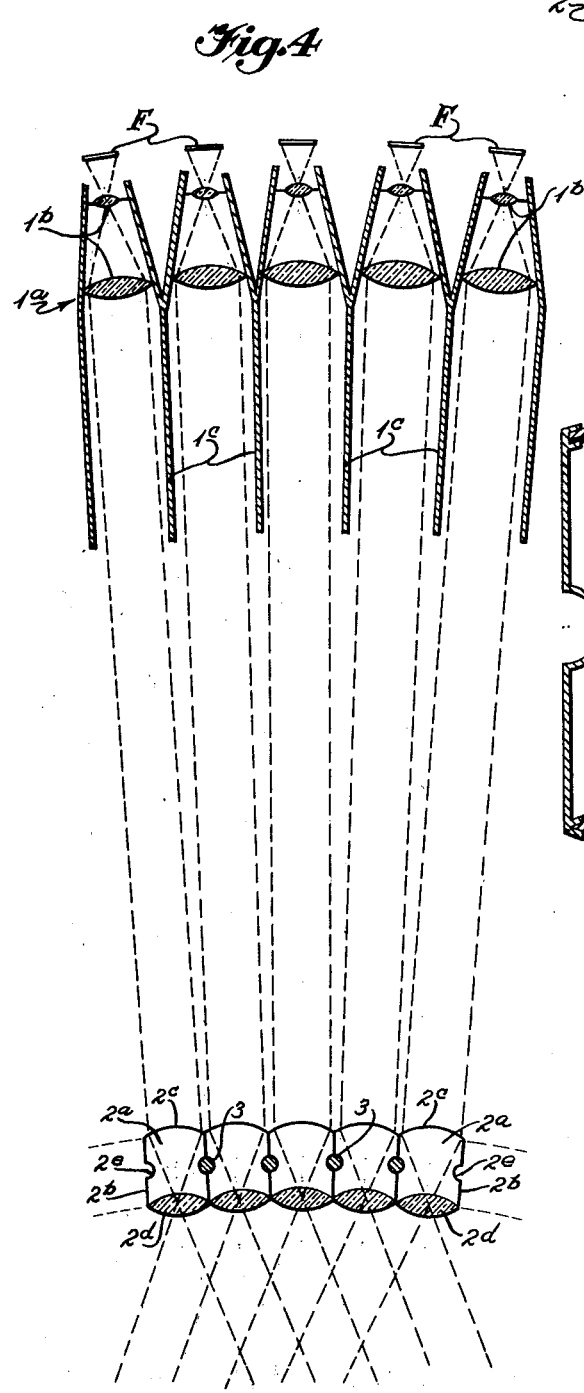
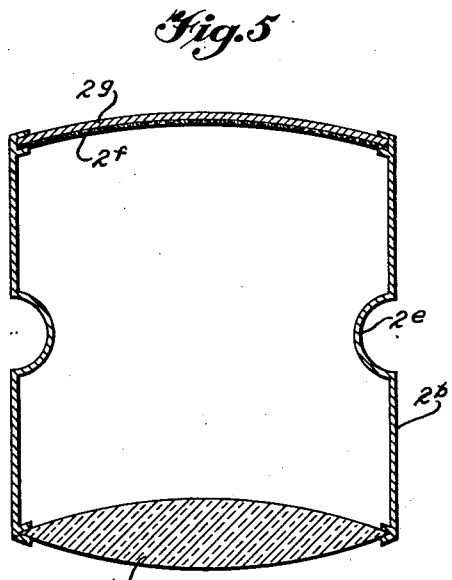
INVENTOR
*Wallace A. Clay*

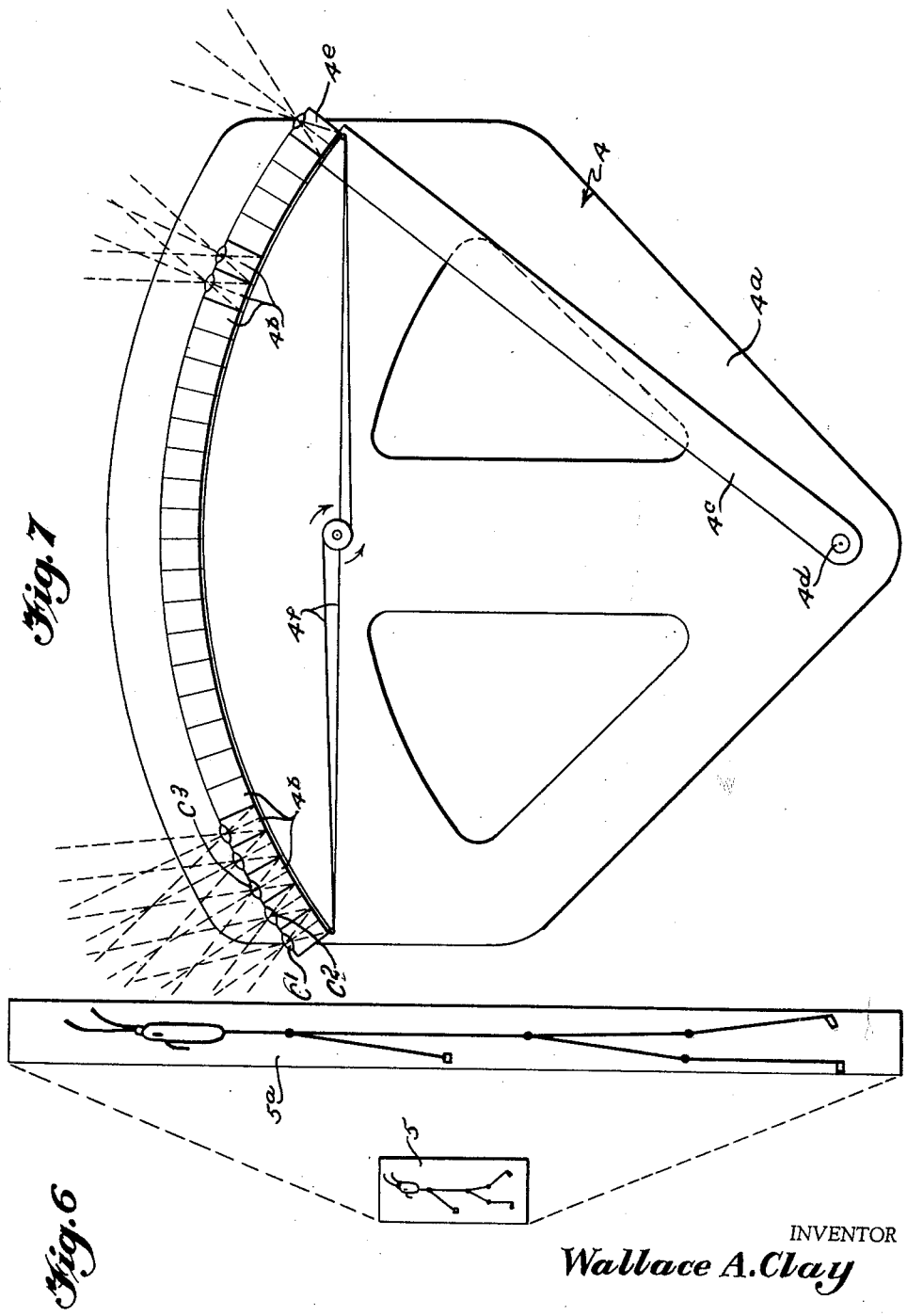

United States Patent Office 3,187,339
Patented June 1, 1965

3,187,339
THREE DIMENSIONAL VIEWING APPARATUS
Wallace A. Clay, Box 120, R.F.D. 3, Ogden, Utah
Filed Oct. 16, 1961, Ser. No. 145,058
6 Claims. (Cl. 352—61)

This is a continuation-in-part of United States patent application by the same inventor and of the same title, Serial No. 422,542, filed April 12, 1954, which is now abandoned.

My invention relates to 3-dimensional photography; and more specifically provides a method and apparatus for photographing and subsequently reproducing a series of stereoscopically related views on an exhibition-size screen in such a way that the composite effect of said views appears to an audience as a 3-dimensional panoramic scene.

The principal object of my invention is to provide a photographic method and apparatus by which either still or motion pictures may be photographed and subsequently reproduced by projection on a special screen, or by which still pictures may be reproduced by arrangement of distorted prints or transparencies behind a special screen, the said images appearing 3-dimensional to an audience without the necessity of personal apppendages of any kind.

My method involves the use of a plurality of cameras which for practical purposes are preferably mounted on the same dolly, the optical systems of the various cameras facing in the general direction of the scene to be photographed and their centers being mutually spaced an equal distance apart. While for rather close-up scenes they may be parallel, for distant scenes the camera axes will be divergent so that adjacent camera axes subtend a desired stereoscopic angle in the range of from 4° down to 5″, but generally of the order of 2°, an accepted stereoscopic angle value. Each of these camera units photographs a portion of the scene, the pictures taken by adjacent cameras overlap considerably as to subject matter, and each picture forms with an adjacent picture a stereoscopic doublet.

In order that a composite of all of the pictures taken may be panoramic, i.e. cover a wide angle, the axes of each of the respective cameras are adjusted either mutually parallel, or else somewhat divergent. The individual sequences of pictures taken by the respective cameras are then projected onto a specially constructed screen by a bank of transversely spaced projectors, in the elementary form of the invention one projector being used for each camera which was used in taking the pictures, OR, in a more advanced form of the invention, a lesser number of projectors than cameras being used and each projector projecting a plurality of adjacent pictures from a composite film.

My screen is a composition of a number of horizontally-adjacent viewing cells each of which is a vertically elongated box having an objective surface at its rear onto which a picture is projected or otherwise disposed or affixed, and having at its front a vertically elongated lens through which the audience views the picture. The pictures disposed upon the scenes of adjacent objective surfaces of adjacent viewing cells correspond in their progression as to relative disposition to the progression of the regularly stepped cameras heretofore mentioned. Screens of a somewhat similar type are not unknown in the prior art.

My invention differs from other approaches in that in my invention in its elementary form each of the individual projectors, if employed, projects its picture on the back objective surface of only one viewing cell, whereas in other approahces to the problem, each projector casts a complete scene, elements of which are impinged on each of the viewing cells.

As stated above, all of the pictures taken by the respective adjacent cameras overlap to a considerable extent with respect to the subject matter photographed. According to my method, each of the pictures thus photographed may subsequently be distorted, i.e. either "compressed" horizontally or "stretched" vertically, so that it may be projected onto the back objective surface of a single viewing cell in its entirety. The vertical stretching of the respective pictures may, of course, be accomplished in any desired manner, i.e., the pictures may be stretched vertically or compressed horizontally after they are photographed and before they are projected, or else the cameras and projectors may be equipped with proper lenses for vertically stretching or horizontally compressing the pictures automatically either as they are taken or as they are projected, so as to produce the elongation required and permit the picture to be projected in its entirety onto the back objective surface of a single viewing cell. The center of each of these viewing cells is spaced from the center of each immediately adjacent viewing cell by a selected value of spacing, as may be arbitrarily determined, and each cell will be as high as is desired for the height of the particular exhibition screen, which screen is the composite of all said viewing cells.

If, therefore, we assume that the entire scene has been protographed by said plurality of cameras and that the resulting pictures have been vertically stretched or horizontally compressed and each projected on the back objective surface of a viewing cell, it should then be apparent that before the composite scene may be viewed by the audience it will be necessary to restore each projected picture (e.g.) to its original vertical-to-horizontal proportion. In other words, having stretched the pictures and having caused them to fit the back objective surface of a vertical screen element, it is then necessary to provide means whereby the pictures may be "unstretched" so that they will have a natural appearance. The "unstretching" of these pictures is accomplished by the lens elements which form the fronts of the viewing cells, which lens elements are anamorphoscopic and may be double convex lenses when viewed in horizontal cross section only and vertically elongated to the full height of the viewing cells.

When a single viewing cell is viewed by one eye from the audience side thereof, the observer will see through the lens of said viewing cell a relatively narrow vertical strip, the selection of which depends upon the position of the observer with respect to the viewing cell, of the picture, which vertical strip will be horizontally magnified by the lens to its original horizontal-to-vertical proportions in such a way that the magnified image of the vertical strip will appear to be the full width of the lens and therefore the full width of the viewing cell as seen by the audience. If the respective distorted (i.e. vertically stretched or horizontally compressed) pictures are properly oriented in progressive, side-by-side relationship on the back objective surfaces of the viewing cells, the magnified strip portions of all the pictures seen by one eye at a particular viewing point in the audience will blend together so as to form a single, composite, panoramic picture corresponding to substantially the entire scene photographed. The remaining eye will also see a single, composite, panoramic scene, similar to the previously mentioned panoramic scene, with corresponding portions of both of said panoramic scenes being stereoscopic doublets.

An important advantage of my system over the prior art systems is that while in each case the foreground portion of the pictures may be quite clear, the background portion of some of the prior art pictures tends to be blurred due to the fact that the background as seen in any single viewing cell is a composite of elements projected by all of the individual projectors converging from different angles. Clarity of the foreground and lack of importance of sharp background render such prior art systems suitable for portraits and close-up work but not for panoramas. The background of the pictures shown according to my system is clear since on each viewing cell the entire background was photographed by a single camera from a single viewing point, thereby accommodating panorama work.

In many of the prior art systems the individual cameras secured to the camera dolly are adjusted so that the axes of their optical systems converge in the direction of the object to be photographed. According to my method, however, the cameras are set either mutually parallel or are set so that they diverge somewhat. The advantage of this divergence of the cameras instead of convergence is that a much larger field is covered, and when these pictures are projected upon the screen, which is concave on the audience side, the scene takes on a panoramic effect, thereby permitting the audience not only to see the entire scene in stereoscopic relief but also to enjoy a much wider field of vision. As to degree of concavity of the viewing screen, the same will usually be equivalent to the degree of divergency of the camera position pattern, although, for certain special effects, slight variation from equivalency may be made.

Another important advantage of using a screen which is concave when viewed from the audience side is that the individual elements forming the composite screen may be adjusted so that the entire screen is visible from any point within the general viewing area but so that substantially the entire screen blacks out simultaneously as the observer moves outside the general viewing area which the screen is designed to serve.

The foregoing description specifies a separate projector for each camera and each corresponding viewing cell. However, in practice a lesser number of projectors would probably be used in which event each projector would cast a plurality of images taken by adjacent cameras, the said images being arranged side-by-side on a composite projection film and the said images each being cast on separate adjacent viewing cells. This simplification of the projection system might go so far as to require only a single projector, especially where a relatively small composite screen is used. In the case of larger composite screens, several projectors would probably be used and their respective projections grouped to serve the several adjacent portions of the screen.

As suggested in the above objects, the viewing cells need not be made the same width as said interocular spacing but may be varied directly in accordance with the distance of the audience from the screen. However, each lens should preferably subtend an angle of the order of 2° with respect to the observer's eye.

The pictures need not be projected on the back objective surfaces of the viewing cells, but may be stretched and printed and placed behind the anamorphoscopic lenses to form a still stereoscopic exhibition that may be used in store window displays, etc.

I will now explain my invention with reference to the drawings which show practical embodiments of my apparatus wherein:

FIGURE 1 is a schematic plan view of a projection system according to my invention, showing the individual pictures projected on the rear objective surfaces of the veiwing cells of the screen and showing the eyes of an observer located on the opposite, or concave, side of the screen.

FIGURE 2 is an enlarged horizontal section through one of the viewing cells showing a complete single picture projected on the rear objective surface of the cell and indicating two separate portions of the picture which will be seen from two different viewing points on the audience side of the screen.

FIGURE 3 is a front elevation view of the composite screen.

FIGURE 4 is a sectional plan view looking down on a plurality of projectors, each casting an image on the back objective surface of an associated viewing cell of the screen. In this form of my apparatus the audience views the pictures on the opposite side of the screen from the projectors.

FIGURE 5 is an enlarged sectional view of a viewing cell which is similar to the viewing cell shown in FIGURE 2 but which is modified to show a stretched positive print forming the back objective surface of the viewing cell, this type of viewing cell being used when my invention serves to provide a non-projection type still exhibition having 3-dimensional panoramic characteristics.

FIGURE 6 shows the stretching of a picture so as to elongate the picture sufficiently to fit the back objective surface of a viewing cell.

FIGURE 7 is a plan view of a camera dolly showing a single camera movably mounted on the dolly for photographing progressively successive portions of the whole panoramic scene for non-projection type exhibition.

Figure 1A:
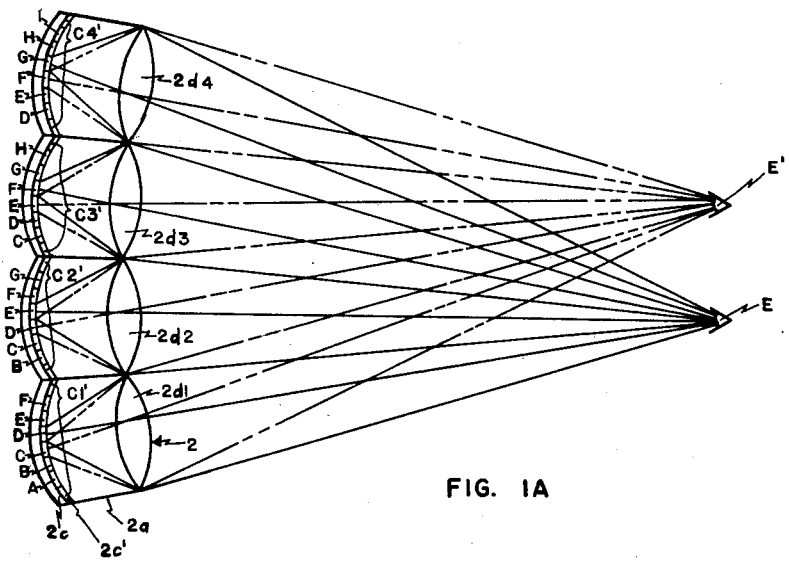
FIGURE 1A is an enlarged detail and schematic diagram, rotated 90° in a counter-clockwise direction, of a portion of the structure of FIGURE 1 and of the optical phenomena which are therein operative, by virtue of the structure disclosed, to produce a stereoscopically viewable panoramic scene.

Referring now to the drawings, FIGURE 1 shows an arcuate series of projectors 1 located behind a projection screen 2, the series of projectors comprising a plurality of individual projection machines 1a each one of which includes, as shown in FIGURE 4, a lens system system 1b located beyond a light source (not shown) and a film F. If the apparatus is to be used for showing motion pictures, each projector would also include a film-feeding mechanism which may be of any conventional type, the individual film-feeding mechanisms of the projectors being all linked together for unitary actuation so as to maintain the projectors synchronized. If the system is to be used for showing slides or other still pictures, then the apparatus shown in FIGURE 4 would include only a light source (not shown), the film F and the lens system 1b. In addition, in order to prevent interference of the light projected by the respective projectors 1a, the latter may be provided with a system of shields 1c.

The screen 2 includes a plurality of vertically oriented elongated viewing cells 2a, FIGURE 3, the number of viewing cells being the same as the number of projectors 1a for the purpose hereinafter stated. FIGURE 2 shows in cross-section one embodiment of a viewing cell which comprises a pair of opposed frame members 2b which are maintained separated in fixed, spaced relationship by an anamorphoscopic lens element 2d and by a translucent rear objective screen element 2c, the latter having a translucent, projected image receiving projection surface 2c' comprising an etched or otherwise treated or painted surface on either side of element 2c. Each of the frame members 2b has a semi-circular recess 2e adapted to receive a rod 3, as shown in FIGURE 4, which rods serve to pin the individual viewing cells together for the purpose of forming a composite screen, as shown in front elevation in FIGURE 3.

As shown in FIGURES 1 and 4, each viewing cell is slightly wider at the rear than it is at the front, so that when all of these viewing cells are assembled to form a composite screen, the screen will be concave on the audience side.

One form of camera means 4, as shown in FIGURE 7, may also include an arm 4c pivoted at one end to the dolly 4a as at 4d. The other end of the arm 4c carries a single camera 4e with which individual photographs may be taken at any one of the several successive camera positions 4b the arm 4c being swung back and forth to any desired position within the range of the fixed camera position 4b by a suitable pulley and cable mechanism 4f, and the dolly being curved to provide the chosen divergence of the bank of camera positions 4b.

Figure 7A:
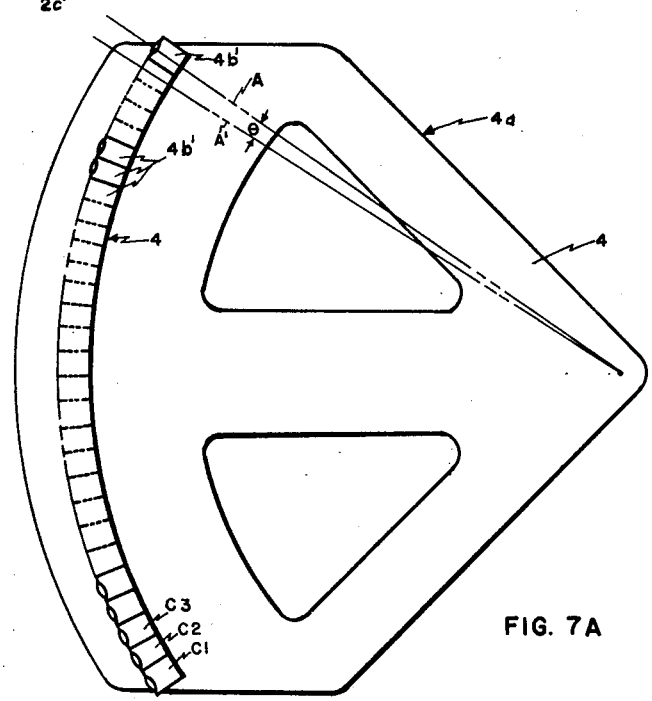
FIGURE 7A is a plan view of a camera dolly having a plurality of divergently arranged cameras, some being shown schematically in phantom lines for convenience of illustration, fixedly mounted thereon for photographing progressively, and preferably simultaneously successive portions of the whole panoramic scene for non-projection type exhibition.

Of course, one may fixedly mount a series of cameras in camera positions 4b in lieu of employing a single, movable camera 4e as shown. Thus, in FIGURE 7A is illustrated camera means 4 which include a dolly 4a adapted to support a plurality of fixedly disposed cameras 4b. The cameras may be of any conventional type and, if the system is to be used for producing motion pictures, the film-feeding mechanisms of the cameras will all be synchronized (not shown). In any event the camera means used is adapted to take exposures from a regularly divergent pattern of camera exposure orientations adjacent ones of which mutually diverge, as herein explained, a stereoscopic angle of the order of 2°, i.e. from 5″ to 4°.

As to camera positioning as is illustrated in FIGURES 7 and 7A, it is to be noted that the camera pattern is divergent outwardly. This divergency enables one to take a wide-angle panorama with a finite number of successively stepped exposures of successively overlapping subject matter, and taken either simultaneously or sequentially. Secondly, the divergent camera pattern, it follows, spaces adjacent camera positions. Where this spacing between adjacent lens positions of the camera means is equivalent to average, human inter-ocular spacing, i.e. 2½ inches, then reproductions of adjacently taken exposures of a close scene, when viewed individually by the respective eyes of the observer, will produce a stereoscopic effect.

However, for panoramic scenes in nature, inter-camera-axis spacing is relegated to less importance, whereas the angle of divergency between adjacent camera position axes becomes of prominent importance for, for greater distances, divergency angle alone and without consideration of inter-camera-position spacing will produce a desired stereoscopic effect over and above that experienced by a viewer viewing binocularly a panoramic scene, provided this divergency angle is maintained within reasonable limits, i.e. from 4° to 5″, which range will be considered herein as of the order of 2°. (It will be remembered that 2° is the accepted value of the "stereoscopic angle," i.e. the angle, subtended by the eyes of the observer relative to a fixed point on an observed object. The 2° figure is generally agreed upon as the angle at which greatest stereoscopic effect is realized; howbeit the eyes might accommodate an angle as high as 4°, with the stereoscopic effect decreasing as the distance between observed object and the observer is increased until, for angles less than 5″, practically no stereoscopic effect will be discernable. This stereoscopic angle is an angle of convergence. The "stereoscopic" angle of divergence relating to adjacent camera positions not only produces a series of displaced camera exposures, reproductions of which may be placed side-by-side to illustrate a panorama, but also insures that corresponding elemental areas of adjacent reproductions, while of the same subject matter, may be viewed stereoscopically since the exposures thereof where taken from different, stereoscopically related camera positions and since, therefore, there will be a shift in foreground relative to background as one proceeds from left to right, as is also the case in convergent systems.)

In FIGURE 7A the angle $\theta$ between adjacent camera axes A and A′ is the divergency angle above spoken of and in magnitude is of the order of 2°, the actual 2° figure being preferable but the range 4°–5″ being acceptable.

Method of operation

My method is carried out by an apparatus, such as has been described, in the following manner:

The cameras 4b in FIGURE 7A, for example, photograph preferably in synchronism, a plurality of progressively related, panoramic sectors which overlap as to subject matter, the individual photographs made by adjacent cameras being mutually related as stereoscopic doublets. In other words, the subject matter photographed by adjacent cameras 4b′ overlap so that each individual picture is similar to each adjacent picture except that it was photographed from a view-point separated from the point from which the adjacent photograph was made by a sufficient distance to establish a definite stereoscopic relationship with the camera position on either side of it. Thus, inter-camera distance will be equal to the chord length of the stereoscopic angle desired (i.e. of the order of 2°) at a radius equivalent to the radius of curvature of the divergent camera pattern. For example, where the radius of curvature of the divergent camera pattern is 7 feet then, for a stereoscopic angle of 2° the inter-camera distance will be approximately 2.5 inches. Although the cameras 4b are shown to be more or less convexly (i.e. divergently) arranged, the degree of divergence shown in FIGURE 7A is exaggerated, and the cameras actually may be arranged either in mutually parallel relation or may be arranged to diverge a selected degree. Actually, a certain amount of divergence of the individual cameras is desirable in order that the individual pictures when projected onto a composite screen of reasonable dimensions may reproduce a panoramic view encompassing a fairly wide angle. With respect to this feature, my method differs from prior art methods since in most prior art methods the individual cameras are arranged in concave orientation so that their axes tend to converge at or near the particular object being photographed; while such is suited for close-ups and portraits, the same is not suitable for panoramas because of the comparatively narrow viewing angle and confused background which necessarily result.

FIGURE 6 illustrates two pictures 5 and 5a respectively. The picture 5 represents a single photograph which might be taken by a single camera 4b (or 4b′), the relative proportions of the subject matter in the picture 5 being to proper scale. The picture 5a, however, has been vertically stretched so that the relative ratio of height to width of the picture 5a is the same as the ratio of height to width of a back objective element 2c of a viewing cell 2a. The stretching of the picture 5 so as to assume the distorted proportion shown at 5a (an "image anamorphosis") in FIGURE 6 may be accomplished by any desired means. For example, the lenses on each individual projector 1a may be ground so as to automatically stretch the picture 5 to the form shown at 5a. Alternatively, the films made by the cameras 4b might be run through a "stretch-printer" so designed that a negative having the proportions shown at 5, when printed or transposed onto positive film, would have the proportions shown at 5a.

The term "image anamorphosis" as used throughout shall be understood to comprise a photographic object such as a print, transparency, and so forth, wherein the horizontal dimension of the subject matter thereof, as at 5a in FIGURE 6, is compressed relative to the vertical dimension of the subject matter.

Regardless of how the stretching of the picture 5 is accomplished, the picture projected by a projector 1a onto the back objective surface 2c of a viewing cell 2a will have such proportions that it will fall entirely upon a single projection surface 2c′ of the appropriate viewing cell 2a.

By reference to FIGURE 2 it will be seen that the viewing cell 2a receives picture 5a (see FIGURE 6) on the translucent projection surface 2c′ of the cell, and that if the lens 2d were removed from the front of this viewing cell 2a, an observer sitting on the audience side of the cell would see the picture exactly as shown in FIGURE 6 at 5a, i.e., distorted. However, the lens element 2d is anamorphoscopic and is so designed that it horizontally magnifies only a relatively narrow vertical strip of the picture 5a. Therefore, a viewer sitting directly in front of the viewing cell 2a, shown in FIGURE 2, would see a vertical strip x of the picture magnified to the width x', and an observer sitting to the right of the viewing cell 2a would see a vertical element y of the picture 5a magnified to the width y'. Note that in each of the cases described above, the observer is assumed to be looking at the viewing cell 2a with only one eye.

However, by reference to FIGURE 1 wherein is shown an observer having two eyes, namely a left eye E and a right eye E', it will be seen by following the dashed lines extending outwardly from each of said eyes that the left eye E looks into one particular viewing cell and that the associated right eye E' looks into the next adjacent viewing cell located immediately to the right.

From the above discussion it should be apparent that each respective eye of an observer views only a narrow vertical element of a picture 5a, and that if the pictures are properly oriented on the back objective surfaces of the respective viewing cells, the narrow vertical strip of one picture 5a as seen by an observer's right eye will be a stereoscopic doublet with respect to the narrow vertical strip of another picture as seen by the observer's left eye, the pictures being magnified by the anamorphoscopic lenses on the respective viewing cells. With the lens elements properly designed on the cameras, projectors and viewing cells, and with the viewing cells properly oriented with respect to each other to form a properly designed composite screen, every observer within the viewing range of the screen will see a continuous picture across the full width of the screen with his right eye and will see a different continuous picture with his left eye, the two pictures being stereoscopically related.

We shall now consider the phenomenon which takes place in detail. Reference is now made to FIGURE 1A wherein a portion of the screen of FIGURE 1 is enlarged and shown in detail, and wherein the optical lines from the eyes E and E' of the observer are drawn for purposes of understanding the invention.

It will be remembered that the camera structure of either FIGURE 7 or FIGURE 7A may be employed to take a progressive series of exposures of a panorama, with the exposures overlapping as to subject matter. If the conventionally established stereoscopic angle of 2° is agreed upon, i.e. the angle at which maximum stereoscopic effect is obtained, then, if the radius of curvature of the camera pattern is seven feet, for example, then adjacent camera position will be, with respect to their respective optical axes, about 2½ inches apart. Obviously, where the radius of curvature of the camera pattern varies from a 7-foot figure, then the inter-camera position facing will also vary, this variation being such, preferably, that the selected stereoscopic angle between adjacent camera positions, be maintained. In any event, the projectors 1a in FIGURE 1 may be supplied transparencies (or developed prints may be used as shown in FIGURE 2) such that the objective screen surface elements 2c may have projected or otherwise disposed thereon respective scene sectors, with adjacent scene sectors being stepped progressively according to the camera pattern aforementioned, and with a respective print or projected scene being disposed upon a respective one of the screen elements 2c.

In continuing our reference to FIGURE 7A, for example, we shall assume that a panoramic scene is being photographed, i.e. the camera film, of the several cameras (or the one camera of FIGURE 7) is exposed so that at camera positions C1, C2, and C3, progressively, respective exposures C1', C2', C3', etc. will be taken. In other words, a regularly progressive plurality of pictures C1', C2', C3', etc., comprising image anamorphoses, of overlapping scene sectors of the scene photographed will have been taken. Adjacent ones of the exposures may be considered as stereoscopic doublets since angular displacement between adjacent camera positions is of the order of 2° (i.e. within the range of 4°-5"). The projectors 1A in FIGURE 1 will respectively project respective ones of said scenes in the same order so these scenes C1', C2', and C3', corresponding to the camera positions C1, C2, and C3, will be disposed upon the surfaces 2c' of adjacent objective screen elements 2c. Of course, rather than using projector apparatus, as in FIGURE 1, the individual reproductions in form of transparencies or prints may be disposed on the objective element 2c as in FIGURE 5 at 2f.

The reproductions (either by projection or by physical indicia) C1', C2', and C3', which constitute image anamorphoses of the scene sectors photographed may be thought of as being comprised of a progressive series of vertical strips (see FIGURE 1A) with the strips C in the reproductions being identical subject matter, the strips D being adjacent but identical subject matter, and so forth. In other words, the vertical strip sector A in C1' corresponds to a portion of the subject matter taken by a camera in position C1 (see FIGURE 7A) but which subject matter portion does not appear in any of the subsequently taken exposures. The reason that it does not appear is because the camera has been displaced progressively in one direction so as to leave area A out of subsequent exposures. However, as in the example shown in FIGURE 1A, subject matter B in reproduction C1', taken in camera position C1, will also be seen at vertical strip area B of reproduction C2' corresponding to camera position C2. The subject matter of the vertical strip areas of the same letter, e.g. B, of the reproductions are identical as to subject matter, but are stereoscopically related, since the exposures from which the reproductions are produced, were taken from displaced vantage points along stereoscopically displaced camera axes.

Where the focal lengths (which are equal) of the lenses 2d (e.g. 5.5 inches) are greater than the (equal) distances (e.g. 4 inches) between the lenses and the image receiving surfaces, then the vertical strip area C at reproduction C1' will be seen by the right eye E', but vertical strip area D and not area C (except possibly for a slight, permissible overlapping fringe) will be seen by the left eye E. On reproduction C2', vertical strip area D will be seen by the right eye E' and strip E seen by the left eye. These elemental vertical strip areas are magnified as virtual images by the respective lenses 2d1, 2d2, 2d3, and 2d4 to the full width of the individual lenses.

As to the left eye E, this eye will see vertical strip area D in reproduction C1', vertical strip area E in reproduction C2', vertical strip area F in reproduction C3', etc. Thus, the left eye will see these vertical strips and subsequent ones, which will be magnified horizontally by the respective lenses 2d(1), 2d(2), 2d(3), and 2d(4) so as to present a blended panorama viewable by the left eye. Correspondingly, the right eye E' will see strip C in reproduction C1', D in C2', E in C3' and so on, the strips being magnified by their respective lenses to the width of the lenses to produce a second panorama. It will be noted that these two panoramas will be substantially the same in character; howbeit, corresponding portions (i.e. magnified corresponding vertical strips) of the two panoramas will be stereoscopic doublets, again by virtue of the different vantage points (see above) from which the exposures resulting in the reproductions were taken.

Where the focal length of the individual lenses, 2d(1), 2d(2), 2d(3), and 2d(4), are equivalent to 5½ inches, for example, and the distance between these lenses and their respective objective screen segments 2c equivalent to 4 inches, approximately, then, not only will the magnified virtual images produced enable the blending in of the panoramas be effectuated, but also the refraction of the individual lenses will be such that the optical ray lines of adjacent vertical segments of a respective reproduction will cross and be seen by the respective eyes so that when both eyes are looking through a single lens, the right eye will not see any portion (save for a slight permissible fringe juncture, to be kept to a minimum) of what the left eye sees, but rather will see a vertical strip area which is adjacent and crossed over with respect thereto. In this manner, the need for a physical septum between the eyes so as to obtain a stereoscopic effect is not needed. What is focused upon the retinas of the two eyes are two respective individual, blended in panoramas (one for each eye) corresponding portions of which are stereoscopically related as stereoscopic doublets.

As to the width of the viewing cells for minimum distortion, these should preferably be such that the same should subtend an angle, with respect to one eye of the observer, which is equivalent to the divergence angle θ of the camera pattern. Thus, the radius of curvature of the camera pattern should equal the nominal or average distance of observation from the screen. The projector pattern of FIGURE 1 should be equivalent in degree of convergence to the degree of divergence of the camera pattern. The nominal arcs the viewing cells 2a and projectors 1a will have a common center spaced from the screen 2, again, a distance equal to the radius of curvature of the camera pattern. Again, for least distortion the objective screen segments 2c and their projection surfaces 2c' should be concave, having a center point of curvature at the optical center of the lines 2d with which they are associated.

Referring again to FIGURE 1, the point C near the lower end of the figure represents the location of the centers of the cameras when the composite scene was photographed. Thus it will be seen that the axes of each individual camera 4b', of each associated viewing cell 2a and of each associated projector 1a are all in alignment. When such axes are all in alignment the entire system is said to be in "tight" formation. However, since it is desirable that the system be capable of serving as large an audience as possible, it has, by experiment, been found possible to rotate each of the viewing cells through a small angle in such a direction that the axes of each viewing cell 2a may be caused to intersect at a point B located further out on the center line of the system than point C, as shown at the bottom of FIGURE 1.

When the individual viewing cells have been thus realigned so as to be somewhat less convergent toward the audience, the individual screen elements are said to be in "loose" formation. Theoretically, repositioning the axes of said viewing cells to "loose" formation will introduce an error into the pictures as seen by the audience. However, experimentation has shown that considerable benefit can be realized by setting the viewing cells in "loose" adjustment because the size of the audience may be considerably increased thereby; and it has also been found by experiment that through relatively small changes of angle (changes from "tight" to "loose" formation) the error is not perceptible to the audience, and therefore the "loose" formation appears to be more satisfactory on a practical basis than the "tight" formation.

The modification shown in FIGURE 5 is made for the purpose of exhibiting stereoscopic still pictures and includes a plurality of viewing cells 2 each having an anamorphoscopic lens 2d on the audience side and each cell having as a back-objective surface a "stretched" positive print 2g with the emulsion side 2f thereof facing toward the lens 2d. This type of exhibition is especially suitable for advertising in stores and store windows, and the composite screen may be produced in any size desired.

Other changes and modifications in the apparatus shown in the respective figures are possible within the scope of the following method and apparatus claims.

I claim:

1. Apparatus for reproducing on a viewing screen, before an audience, and in stereoscopic relief, a scene employing a progressive series of stereoscopically related pictures adjacent ones of which are stereoscopic doublets, said apparatus comprising: a composite contiguous viewing screen including a horizontal series of viewing cells each havng a back, projected image receiving projection surface and a front lens in light communication therewith and spaced therefrom a distance less than the focal length of the lens, the respective distances between the individual lenses and their respective projection surfaces being equivalent, and the widths of the respective viewing cells being equal; a plurality of horizontally spaced projector means each directed solely toward the projection surface of a single associated cell to cast thereon a respective one of a regularly progressive plurality of pictures of overlapping scene-sectors of a scene photographed, said front lenses being anamorphoscopic to magnify horizontally, selected vertical strips of said pictures, selection being determined by the position of the observer; and means for distorting the vertical-to-horizontal proportions of the pictures prior to casting them onto the projection surfaces to compensate for the horizontal magnification of said lenses, said lenses being so constructed and so arranged, of themselves and with repect to their repective, projected image receiving projection surfaces, that from each viewing angle in the audience there will be seen by the respective eyes of an observer through each front lens respective images which are coextensive in angle subtended with said lens, with respect to said respective eyes, and which correspond to adjacent ones of said narrow vertical strips of each distorted picture but are magnified horizontally to restore the original proportions thereof, and that said images as seen through all the lenses combine and blend together in two independent series, seen by the respective eyes, to produce two, independent, composite scenes, each viewable by a single eye, corresponding portions of said composite scenes being stereoscopically related.

2. Apparatus as set forth in claim 1 wherein said projector means comprise synchronized motion picture machine means.

3. Apparatus for reproducing on a viewing screen, before an audience, and in stereoscopic relief, a panoramic scene employing a progressive series of stereoscopically related pictures adjacent ones of which are stereoscopic doublets, said pictures being taken divergently outwardly toward the panoramic scene, said apparatus comprising: a composite viewing screen including a horizontal series of contiguous viewing cells compositely arcuate in degree corresponding to the degree of divergence at which the progressive series of pictures were taken, each viewing cell having a back, projected image receiving projection surface and a front lens in light communication therewith and spaced therefrom a distance less than the focal length of the lens, the respective distances between the individual lenses and their respective projection surfaces being equivalent, and the widths of the respective viewing cells being equal; horizontally spaced projector means directed toward the projection surfaces of said associated cells to cast, solely upon corresponding ones only of said cells, successive ones of a plurality of pictures taken of said panoramic scene from a regularly divergent pattern of exposure orientations adjacent ones of which mutually diverge toward said scene a stereoscopic angle of a magnitude of the order of 2°, said front lenses being anamorphoscopic to magnify horizontally, selected vertical strips of said pictures, selection being determined by the position of the observer; and means for distorting the vertical-to-horizontal proportions of the pictures prior to casting them onto the projection surfaces to compensate for the horizontal magnification of said lenses, said lenses being so constructed and so arranged, of themselves and with respect to their respective, projected image receiving surfaces, that from each viewing angle in the audience there will be seen by the respective eyes of an observer through each front lens respective images which are coextensive in angle subtended with said lens, with respect to said respective eyes, and which correspond to adjacent ones of said narrow vertical strips of each distorted picture but are magnified horizontally to restore the original proportions thereof, and that said images as seen through all the lenses combine and blend together in two independent series, seen by the respective eyes, to produce two, independent, composite scenes, each viewable by a single eye, corresponding portions of said composite scenes being stereoscopically related.

4. Apparatus for reproducing on a viewing screen, before an audience, and in stereoscopic relief, a scene employing a progressive series of stereoscopically related pictures adjacent ones of which are stereoscopic doublets, said apparatus comprising: a composite viewing screen including a horizontal series of contiguously disposed lenses and projected image receiving surface means disposed rearwardly of said lenses at a distance less than the focal lengths thereof, said lenses having equivalent focal lengths and equivalent widths; a plurality of horizontally spaced projector means each directed toward a portion of said image receiving surface means in registry with a respective one of said lenses to cast thereon, a respective one of a plurality of pictures taken of said panoramic scene from a regularly divergent pattern of exposure orientations adjacent ones of which mutually diverge toward said scene a stereoscopic angle of a magnitude of the order of 2°, each of the series of pictures being in respective registry with a respective one of said lenses, said lenses being anamorphoscopic to magnify, horizontally, selected vertical strips of said pictures, selection being determined by the position of the observer; and means for distorting the vertical-to-horizontal proportions of the pictures prior to casting them onto the image receiving surface means to compensate for the horizontal magnification of said lenses, said lenses being so constructed and so arranged, of themselves and with respect to said image receiving surface means, that from each viewing angle in the audience there will be seen by the respective eyes of an observer through each of said lenses respective images which are coextensive in angle subtended with said lens, with respect to said respective eyes, and which correspond to adjacent ones of said narrow vertical strips of each distorted picture but are magnified horizontally to restore the original proportions thereof, and that said images as seen through all the lenses combine and blend together in two independent series, seen by the respective eyes, to produce two, independent, composite scenes, each viewable by a single eye, corresponding portions of said composite scenes being stereoscopically related.

5. Apparatus according to claim 4 wherein the pictures are taken along mutually diverging axes, the axes of the lenses being equally convergent, the angular divergence between two adjacent axes of the pictures being equal to the angle subtended by the width dimension of each lens as measured from the point of convergence of the axes of the lenses.

6. Apparatus for reproducing on a viewing screen, before an audience, and in stereoscopic relief, a panoramic scene employing a progressive series of stereoscopically related pictures adjacent ones of which are stereoscopic doublets, said pictures being taken divergently outwardly toward the panoramic scene, said apparatus comprising: a composite viewing screen including a horizontal series of contiguous viewing cells compositely arcuate in degree corresponding to the degree of divergence at which the progressive series of pictures were taken, each viewing cell having a back, projected image receiving projection surface and a front lens in light communication therewith and spaced therefrom a distance less than the focal length of the lens, the respective distances between the individual lenses and their respective projection surfaces being equivalent, and the widths of the respective viewing cells being equal; horizontally spaced projector means directed toward the projection surfaces of said associated cells to cast, solely upon corresponding ones only of said cells, successive ones of a plurality of pictures taken of said panoramic scene from a regularly divergent pattern of exposure orientations adjacent ones of which mutually diverge toward said scene a stereoscopic angle of a magnitude lying within the range of 5″ to 4°, said front lenses being anamorphoscopic to magnify horizontally, selected vertical strips of said pictures, selection being determined by the position of the observer; and means for distorting the vertical-to-horizontal proportions of the pictures prior to casting them onto the projection surfaces to compensate for the horizontal magnification of said lenses, said lenses being so constructed and so arranged, of themselves and with respect to their respective, projected image receiving surfaces, that from each viewing angle in the audience there will be seen by the respective eyes of an observer through each front lens respective images which are coextensive in angle subtended with said lens, with respect to said respective eyes, and which correspond to adjacent ones of said narrow vertical strips of each distorted picture but are magnified horizontally to restore the original proportions thereof, and that said images as seen through all the lenses combine and blend together in two independent series, seen by the respective eyes, to produce two, independent, composite scenes, each viewable by a single eye, corresponding portions of said composite scenes being stereoscopically related.

References Cited by the Examiner

UNITED STATES PATENTS

| 1,392,475 | 10/21 | Bingham | 352—70 |
| 1,862,847 | 6/32 | Draper | 88—24 |
| 1,883,290 | 10/32 | Ives | 88—24 |
| 1,918,705 | 7/33 | Ives | 95—18 |
| 1,937,118 | 11/33 | Ives | 352—61 |
| 2,223,630 | 12/40 | Levy | 95—18 |
| 2,833,176 | 5/58 | Ossoinak | 352—81 |
| 3,024,694 | 3/62 | Shuftan | 88—24 |

FOREIGN PATENTS

| 750,154 | 5/33 | France. |
| 409,663 | 4/34 | Great Britain. |
| 466,823 | 6/50 | Italy. |

JULIA E. COINER, *Primary Examiner.*

EMIL G. ANDERSON, *Examiner.*